March 5, 1963 — H. VALIS — 3,079,855
SELF DRAINING FAT COLLECTING COOKER
Filed Oct. 13, 1958
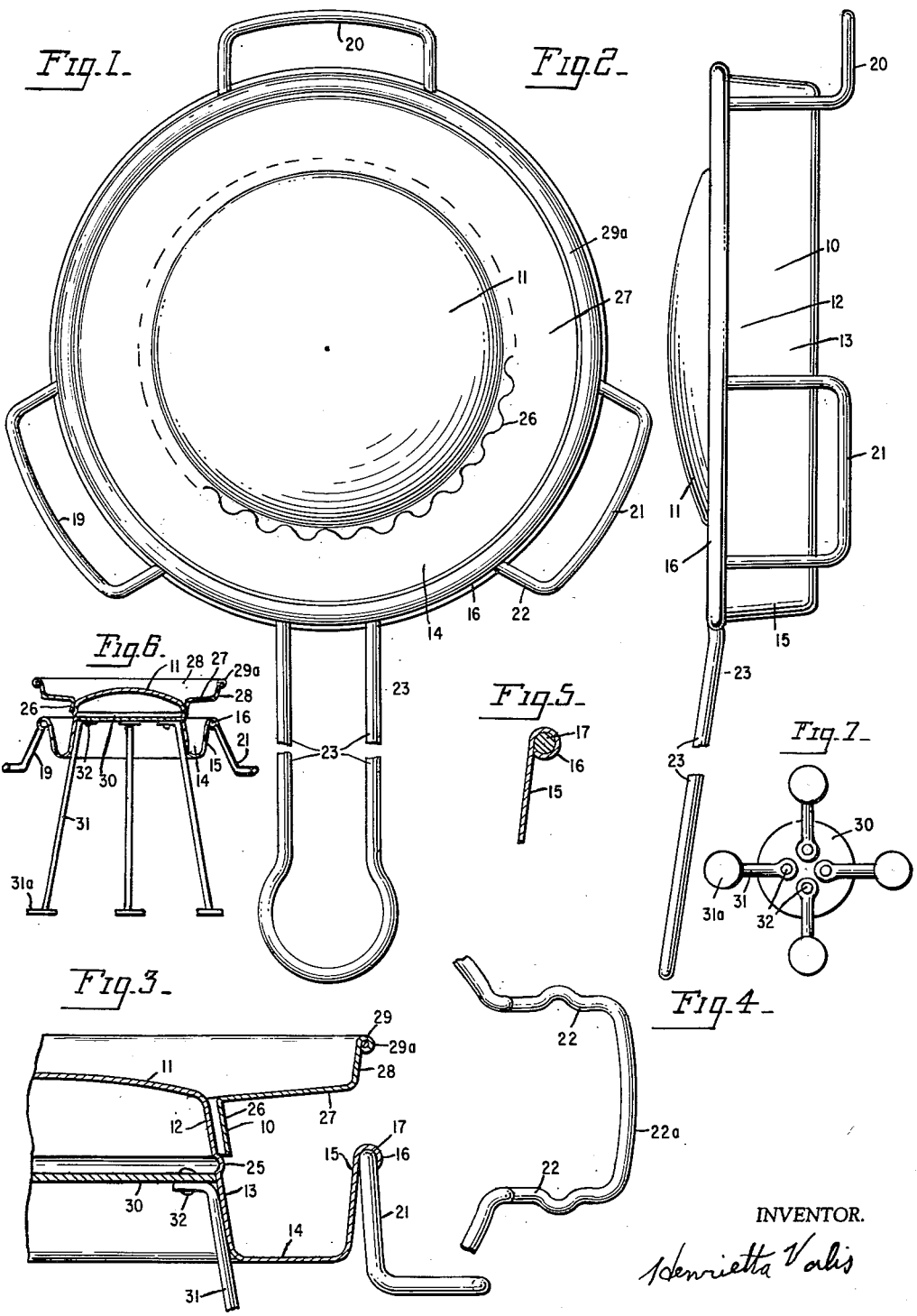
INVENTOR.
Henrietta Valis

United States Patent Office 3,079,855
Patented Mar. 5, 1963

3,079,855
SELF DRAINING FAT COLLECTING COOKER
Henrietta Valis, 3212 Surf Ave., Brooklyn, N.Y.
Filed Oct. 13, 1958, Ser. No. 766,832
2 Claims. (Cl. 99—339)

This invention relates to an improved cooking utensil, designed for cooking hamburgers and similar food units, and one of its objects is to provide a device having a heated supporting surface which is formed with a low slope so that the fat of the ground meat will separate from the edible material and will drain away from the meat, so that the meat will be cooked with a superior flavor and in a shorter period of time, due to the removal of the fat, which acts as a heat insulating medium to delay the cooking of the meat.

Another object of the invention is the provision of a cooking device with an elevated cooking surface made convex and capable of supporting ground meat or other food units in place thereon without sliding, and an annular drain or collection trough located below the cooking surface, and so arranged that fat drained from the concave cooking surface will be received by the trough.

Another object of the invention is to provide a cooking device of this type with a concave cooking surface supported above the flame or burner, a wire frame which is coupled to the rim of the cooking device and which is provided with U-shaped supporting feet disposed around the rim of the device, and a handle which extends in radial relation to the device.

A still further object of the invention is the provision of a device of this character, which is constructed of sheet metal and which is provided with an annular meat warming ring coupled thereto by means of a corrugated collar which has a clutching fit on the wall of the raised cooking device, and which extends outwardly of this wall, so that partially cooked or wholly cooked meat may be kept warm, and any fat retained by this meat can drain inwardly against the wall of the device into the receiving trough thereof.

With the above and other objects in view, the invention comprises certain new and useful constructions, combinations and arrangements of parts, clearly described in the following specification and fully illustrated in the accompanying drawings, in which:

FIG. 1 is a top plan view, showing the handle partly broken.

FIG. 2 is a side elevation thereof.

FIG. 3 is a detail vertical sectional view, taken on line 3—3 of FIG. 1, looking in the direction of the arrows.

FIG. 4 is a detail plan view of one of the supporting wire feet of the handle rim ring.

FIG. 5 is a detail sectional view through the edge of the rolled rim of the sheet metal device.

FIG. 6 is a vertical sectional view, on a reduced scale, showing a folding stand within the domed cooking unit.

FIG. 7 is a detail plan view of the stand, removed.

Referring to the accompanying drawings, which illustrate the practical embodiment of my invention, 10 designates a dome-shaped cooking device, constructed, as shown from sheet metal material, and provided with a concave-convex cooking plate 11 and a slightly conical wall 12, formed integral with the cooking plate 11. The conical wall 12 is also formed integrally with the annular wall 13 of the grease or fat collecting trough 14, which is provided with an upstanding guard wall or flange 15, having an outwardly curled or rolled edge 16. This guard wall or flange is spaced outwardly of the conical inner wall 12 and the curled edge 16 thereof is shown to be disposed below the plane of the concave cooking plate 11. A stiffening wire ring 17 may be disposed within the curled edge 16.

The wire ring 17 is formed with a plurality of U-shaped legs or feet 19, 20 and 21. Each of these feet or legs is formed with L-shaped side members 22, and a connecting bar 22a which is slightly arched, and which is adapted to rest on the bars, parallel or intersecting, of the grate or grille of the burner, not shown.

The wire ring 17 is also formed with a handle loop 23, also of U-shaped construction, which extends radially upwards from the guard wall or flange 15, and may be provided with a heat radiating handle coil 24, curled around the shanks of the handle.

The conical wall 12 is formed with a bead or stop 25, which is engaged by the corrugated inner ring 26 of the food warming pan 27, which is of annular construction, and which slopes inwardly and downwardly to the retaining clutch ring or flange 26. The annular food warming pan 27 is provided on its outer edge with an upstanding marginal stop flange 28, which is curled at 29a outwardly over a stiffening wire ring 29.

The cooking device or utensil is supported by the U-shaped feet so that the grease or fat collecting trough 14 will be elevated above the burner to allow the waste products of gas combustion or the heated air of an electrical burner to freely circulate under the domed cooking plate or device.

My invention has been found particularly useful in cooking ground meat or hamburgers. The shaped meat is deposited on the concave cooking plate when the device is placed over a live stove burner, and a low heat is preferred. The fat of the meat quickly drains over the concave cooking plate and flows downwardly in the numerous spaced openings provided by the corrugated clutch ring or flange 26 around the conical wall 12 and collects in the trough 14, outwardly of the burner.

The rapid drainage of the fat from the ground meat allows the heat of the burner to cook the meat in a shorter period of time, as the fat while it adheres to the meat acts to insulate the meat from the influence of the heat of the burner, and the meat is then cooked by low temperature heat so that its natural flavor is retained and the cooked meat becomes really delicious. The cooking time is also reduced by more than one half.

The cooked meat takes on a flavor similar to that obtained by cooking meat over a flame or over flaming coals. In these operations the fat is removed by the action of the intense heat of the flaming coals or the flames of gas.

In home cooking the use of open flames or of flaming coals of charcoal or other fuels is not considered safe, and in most cases would be prohibited. My invention provides for complete masking of the flame or heat source, by a dome-shaped cooking plate, having a fat draining concave surface and a receiving trough which surround the marginal area of the burner.

The annular warming pan may be easily removed from the conical wall of the cooking plate, by slipping it upwardly. The handle is permanently connected to the cooking plate at the marginal flange of the grease or fat trough, so that in effect there are but two parts to the cooking utensil, which permits of easy and thorough cleansing.

The device may be used on any type of burner, kerosene, gasoline, bottled or pipe gas, charcoal, coal, wood or electrical. It is understood that the conical wall 12 would be large enough in each and every case to enclose all of the heat emitting area of the burner.

The device may be constructed in any size found necessary and various modifications and adjustments may be carried out to adapt the invention to various conditions of service, without departing from the scope of the invention, as defined by the claims hereof.

In FIGS. 6 and 7 I show a metal stand for supporting the cooking unit above an outdoor fire, which includes the top plate 30 of circular shape, and a plurality of legs 31 pivotally secured at 32 to the top plate. The legs 31 diverge downwardly and outwardly from the top plate, and each leg is provided with a ground engaging foot 31a, welded or otherwise secured or formed thereon. The stand thus constructed of the legs and top plate is inserted in the conical wall 13, as indicated in FIGS. 3 and 6, and provides a level support for the cooking unit.

It is understood that various changes in the details of construction, their combination and arrangement, may carried out, in accordance with the invention, as defined by the claims hereof.

Having described my invention I claim as patentable:

1. A cooking device, comprising a hollow sheet metal body having a convex cooking surface on the upper end thereof and an annular grease receiving trough on the lower end thereof, said body having a conical side wall provided with a bead, and an annular warming pan having a corrugated flange on the inner edge thereof which has a clutch fit on conical side wall and which engages said bead, the corrugated flange providing openings around said conical wall to allow grease drained from the convex cooking surface to flow from said surface on said conical wall and into said receiving trough.

2. A cooking device comprising, a hollow body having an upright wall and a slightly convex cooking plate at the upper end of said upright wall and an external stop on said upright wall located below said cooking plate, an annular warming plate located around said upright wall and cooking plate and having a corrugated collar having a clutch fit with said upright wall and engaged with said external stop and supported thereby so that said plate is supported with its inner edge portion adjacent to the lowermost outer edge of the cooking plate, and a fat collecting trough connected with said upright wall and extending outwardly thereof, the warming plate being sloped upwardly and outwardly from the cooking plate to drain fat to said upright wall and trough.

References Cited in the file of this patent

UNITED STATES PATENTS

| 243,714 | Libbey | July 5, 1881 |
|---|---|---|
| 427,519 | Milner | May 6, 1890 |
| 1,266,308 | Peck | May 14, 1918 |
| 1,542,867 | Fisher | June 23, 1925 |
| 2,554,412 | Kavanagh | May 22, 1951 |
| 2,660,108 | Baer | Nov. 24, 1953 |
| 2,719,579 | Schaffer | Oct. 4, 1955 |
| 2,851,943 | Smagula | Sept. 16, 1958 |

FOREIGN PATENTS

| 145,219 | Great Britain | July 2, 1920 |
|---|---|---|
| 309,263 | Great Britain | Apr. 11, 1929 |